(12) United States Patent
Nishio

(10) Patent No.: US 12,427,862 B2
(45) Date of Patent: Sep. 30, 2025

(54) SPREAD ASSIST DEVICE

(71) Applicant: KAWASAKI MOTORS, LTD., Akashi (JP)

(72) Inventor: Ryo Nishio, Irvine, CA (US)

(73) Assignee: KAWASAKI MOTORS, LTD., Akashi (JP)

(*) Notice: Subject to any disclaimer, the term of this patent is extended or adjusted under 35 U.S.C. 154(b) by 477 days.

(21) Appl. No.: 17/902,973

(22) Filed: Sep. 5, 2022

(65) Prior Publication Data
US 2024/0075812 A1    Mar. 7, 2024

(51) Int. Cl.
| | |
|---|---|
| B60K 35/22 | (2024.01) |
| B60K 35/28 | (2024.01) |
| G06T 11/00 | (2006.01) |
| B60K 35/10 | (2024.01) |
| B60K 35/20 | (2024.01) |
| B60K 35/29 | (2024.01) |
| B60K 35/81 | (2024.01) |

(52) U.S. Cl.
CPC .............. *B60K 35/22* (2024.01); *B60K 35/28* (2024.01); *G06T 11/00* (2013.01); *B60K 35/10* (2024.01); *B60K 35/20* (2024.01); *B60K 35/29* (2024.01); *B60K 35/81* (2024.01); *B60K 2360/151* (2024.01); *B60K 2360/166* (2024.01); *B60K 2360/18* (2024.01); *G06T 2200/24* (2013.01)

(58) Field of Classification Search
CPC ........ B60K 35/00; B60K 35/81; B60K 35/28; B60K 2360/166; B60K 35/29; B60K 35/20; B60K 2360/18; B60K 35/10; B60K 2360/151; G06T 11/00; G06T 2200/24

See application file for complete search history.

(56) References Cited

U.S. PATENT DOCUMENTS

| | | | |
|---|---|---|---|
| 2016/0146611 A1* | 5/2016 | Matthews | G05D 1/0217 |
| | | | 701/533 |
| 2016/0308954 A1* | 10/2016 | Wilbur | H04L 67/52 |
| 2016/0318549 A1* | 11/2016 | Cook | B62D 1/12 |
| 2017/0349058 A1* | 12/2017 | Bernier | H02J 13/00004 |
| 2019/0208695 A1* | 7/2019 | Graf Plessen | A01B 69/008 |
| 2021/0315151 A1* | 10/2021 | Schoon | G01C 21/3807 |
| 2021/0341944 A1* | 11/2021 | Schoon | G06F 16/1744 |
| 2022/0078964 A1* | 3/2022 | Takeda | G06Q 50/02 |
| 2022/0279698 A1* | 9/2022 | Yoshimura | A01B 69/008 |
| 2024/0075812 A1* | 3/2024 | Nishio | G06T 11/00 |
| 2024/0389493 A1* | 11/2024 | Keene | B62D 1/00 |

FOREIGN PATENT DOCUMENTS

| | | |
|---|---|---|
| JP | 2011-87528 A | 5/2011 |
| JP | 2017-127206 A | 7/2017 |
| JP | 2020-54273 A | 4/2020 |

* cited by examiner

*Primary Examiner* — Hussein Elchanti
(74) *Attorney, Agent, or Firm* — METROLEX IP LAW GROUP, PLLC; Robert L. Scott, Esq.

(57) ABSTRACT

A spread assist device for assisting spreading by a spreader apparatus according to an embodiment includes a position detector configured to detect a position of the spreader apparatus and a controller. The controller is configured to obtain spread width information indicating a spread width of the spreading object to be spread by the spreader apparatus, obtain tracking information of the detected position of the spreader apparatus detected by the position detector, and generate a virtual overhead view image including a spread path based on the obtained spread width information and tracking information.

18 Claims, 11 Drawing Sheets

SPREAD ASSIST DEVICE

BACKGROUND

The disclosure relates to a spread assist device for assisting spreading by a spreader apparatus.

In a related art, there has been known a spreader apparatus for spreading fertilizers, seeds, pesticides, and other spreading objects on a field such as a farm and other locations (for example, Patent Document 1).

Patent document 1: JP2011-87528

The spreader apparatus disclosed in Patent Document 1 is provided with a remaining amount sensor so as to detect a remaining amount of a spreading object such as a fertilizer, seed, pesticide, or the like in a hopper of the spreader apparatus. In such a spreader apparatus, there may be a desire to spread the spreading object evenly over the field, such as a farm, pasture, park, or the like. However, if the spreading object is similar to the ground or weeds in color, these may be difficult to distinguish from each other. In addition, since the spreading object is spread behind the spreader apparatus in the travel direction of the spreader apparatus, it may be difficult for the user riding on the spreader apparatus to check the spread status. As a result, the worker may have to stop the spreader apparatus once, get off the spreader apparatus, and check the spread status, which may decrease the efficiency of the spreading operation.

SUMMARY

An object of an embodiment of the disclosure is to provide a spread assist device and a spread assist method for assisting spreading of a spreading object by a spreader apparatus.

A first aspect of the disclosure is a spread assist device for assisting spreading by a spreader apparatus. The spread assist device includes a position detector configured to detect a position of the spreader apparatus and a controller including one or more processors. The controller is configured to obtain spread width information indicating a spread width of a spreading object to be spread by the spreader apparatus in a width direction orthogonal to a travel direction of the spreader apparatus, obtain tracking information of the detected position of the spreader apparatus detected by the position detector, and generates, based on the obtained spread width information and tracking information, a virtual overhead view image including an on-going spread path having the spread width, which is to be displayed on a display.

According to the first aspect, an operator can perform a spreading operation based on the virtual overhead view image including the spread path having the spread width. With this, the operator can continue the spreading operation while checking the spread path without getting off the spreader apparatus.

A second aspect of the disclosure is a spread assist device for assisting spreading by a spreader apparatus. The spread assist device includes an image capturing device configured to capture an image of a field behind the spreader apparatus in a travel direction of the spreader apparatus, and a controller including one or more processors. The controller is configured to display, on a display, the image of the field behind the spreader apparatus captured by the image capturing device while the spreader apparatus is traveling.

According to the second aspect, an operator can perform a spreading operation while viewing the real-time captured image behind the spreader apparatus in the travel direction. This allows the user to check the spread status and continue the spreading operation without getting off the spreader apparatus.

DETAILED DESCRIPTION

Figure 1:
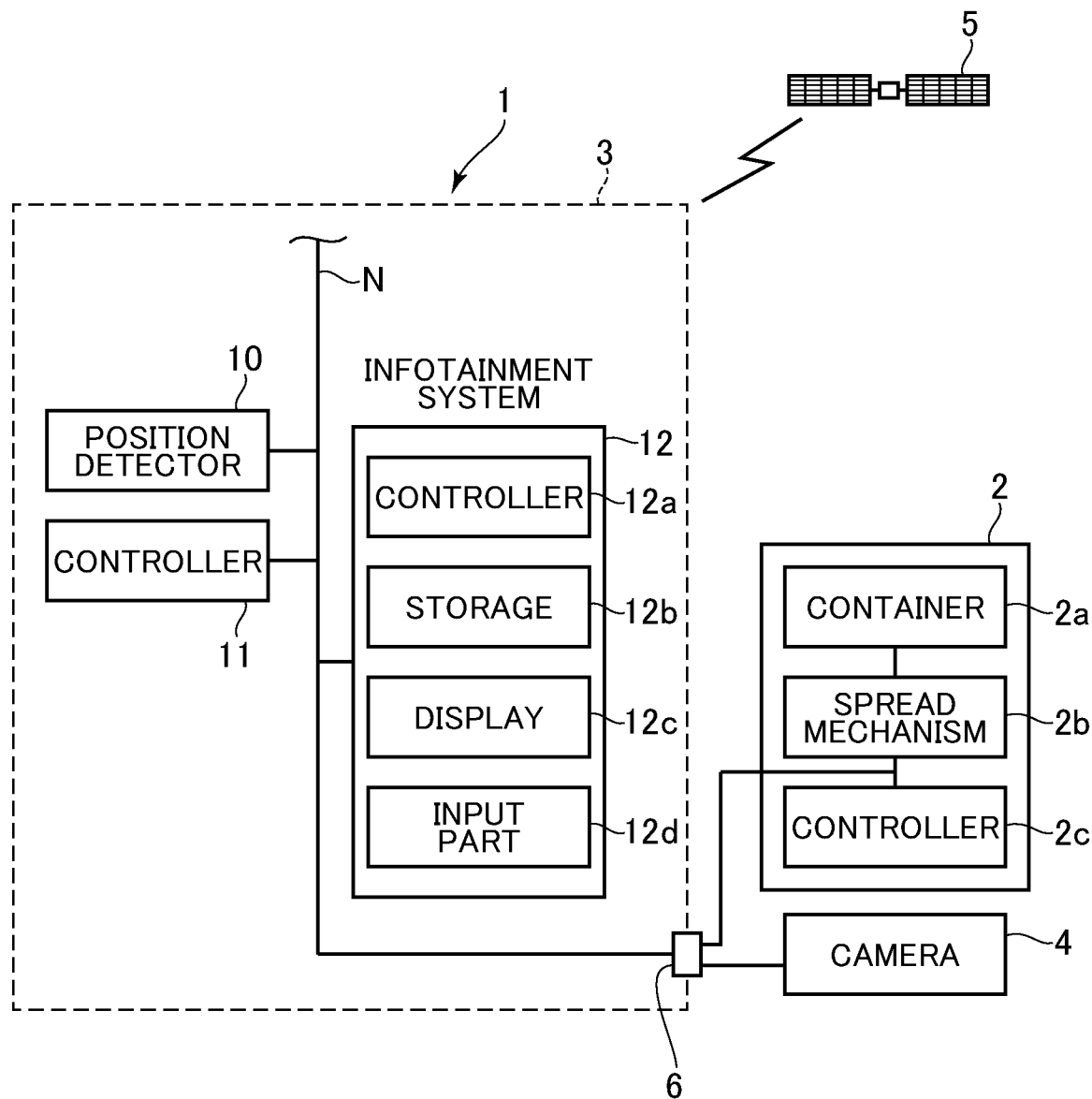
FIG. 1 is a block diagram of a spreader apparatus according to an embodiment.

Descriptions are provided hereinbelow for one or more embodiments based on the drawings. In the respective drawings referenced herein, the same constituents are designated by the same reference numerals and duplicate explanation concerning the same constituents is omitted. All of the drawings are provided to illustrate the respective examples only.

(Spreader Apparatus)

Figure 2:
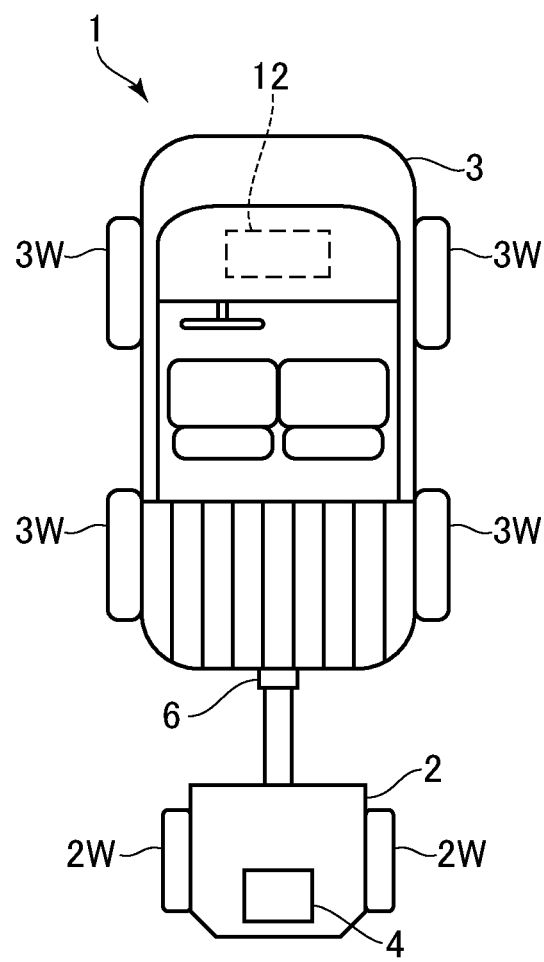
FIG. 2 is a schematic plan view of the spreader apparatus according to an embodiment.

First, an overall configuration of a spreader apparatus 1 is explained with reference to FIGS. 1 and 2. As illustrated in FIGS. 1 and 2, the spreader apparatus 1 includes a spreader 2 or a spreader apparatus main part 2, a vehicle 3 (such as a tractor, a utility vehicle) to drive the spreader 2. For example, the spreader 2 is connected to a rear part of the traveling vehicle 3, and the spreader 2 is towed by the traveling vehicle 3.

More specifically, a coupler 6 is provided at the rear part of the vehicle 3. The spreader 2 can be attached to and detached from the coupler 6. Therefore, the spreader 2, being connected to the coupler 6, can be towed by the vehicle 3.

The vehicle 3 is an engine vehicle, an electric vehicle, or the like, and includes a prime mover such as an engine (gasoline engine or diesel engine) or an electric motor, and a transmission. The vehicle 3 is also provided with a cabin including a driver's seat. In addition, an infotainment system 12 is provided in front of the driver's seat. For example, on an instrument panel in front of the driver's seat, a display 12c and an input part 12d of the infotainment system 12 are provided.

The spreader 2 includes, for example, a hopper 2a as a container and is configured to drop a spreading object such as fertilizer, chemicals, water, and the like. While the spreader 2 is being moved by the vehicle 3, the spreader 2 drops the spreading object along a traveling path of the spreader 2.

The spreader 2 includes a container 2a that can store therein the spreading object, a spread mechanism 2b configured to spread the spreading object contained in the container 2a to the outside of the container 2a, and a controller 2c. For example, the spread mechanism 2b includes a shutter configured to open and close an opening (a spreading port) provided at a lower part of the container 2a and a driving part or a driver configured to drive the shutter to open and close. The spread mechanism is configured, by opening the shutter, to drop the spreading object contained in the container 2a onto the field. Note that the structure of the spread mechanism 2b is not limited, and any structure can be used for the spread mechanism 2b as long as the spread mechanism 2b can discharge the spreading object contained in the container 2a to the outside of the container 2a.

The controller 2c of the spreader 2 is composed of a CPU or the like and controls the spread mechanism 2b based on a spreading amount and/or the like instructed by the user, so as to control an opening/closing amount (opening degree) of the container 2a, timing of opening/closing the container 2a, and/or etc. In other words, the controller 2c of the spreader 2 controls, based on the instructions from the user, the spreading amount per unit of time that is spread from the spreader 2.

A camera 4 serving as an image capturing device is detachably attached to the spreader 2. The camera 4 is oriented such that the imaging direction thereof is directed in an opposite direction (backward) of the travel direction of the spreader apparatus 1. The image captured by the camera 4 (image signal) is transmitted to the infotainment system 12 via the coupler 6. The camera 4 may be mounted on the vehicle 3 instead of the spreader 2.

The vehicle 3 includes a position detector 10, a controller 11, and the infotainment system 12. The position detector 10, the controller 11, and the infotainment system 12 are connected through an in-vehicle network N.

The position detector 10 is configured to detect a current position of the spreader apparatus 1. In this embodiment, the position detector 10 uses a satellite positioning system (Global Navigation Satellite System (GNSS) such as Global Positioning System, Galileo, GLONASS, etc.) to detect the position of the spreader apparatus 1. In other words, the position detector 10 receives satellite signals (radio waves) from positioning satellites 15 and detects the position of the position detector 10.

In an embodiment illustrated in FIG. 1, the position detector 10 is installed in the vehicle 3, but may be installed in the spreader 2. In an embodiment illustrated in FIG. 1, the position detector 10 uses the satellite positioning system to detect the position of the spreader apparatus 1. However, the position of the spreader apparatus 1 may be detected using a gyro sensor and a vehicle speed sensor, and any other position detectors as long as the position of the spreader apparatus 1 can be detected. In other words, the position detection (position calculation) method of the position detector 10 is not limited.

The position detected by the position detector 10 can be obtained via the in-vehicle network N by the controller 11, the infotainment system 12, and the like of the vehicle 3.

The controller 11 of the vehicle 3 is composed of a CPU or the like and controls traveling of the vehicle 3 based on operation signals from control devices (steering wheel, operation levers, operation switches, etc.) installed near the driver's seat when the user operates the control devices, detection signals from various sensors installed in the vehicle 3, and etc. For example, the controller 11 controls a coupling mechanism of the coupler 6 based on an operating signal of a control tool and controls an engine speed based on an accelerator pedal sensor. The controller 11 controls a work system and a travel system of the vehicle 3, and the control method thereof is not limited.

The infotainment system 12 of the vehicle 3 includes a controller 12a, a storage 12b, the display 12c, and the input part 12d. The controller 12a of the infotainment system 12 is composed of a CPU or the like and performs various controls related to the infotainment system 12 based on programs stored in the storage 12b or the like. The storage 12b is a nonvolatile memory or the like, which stores various information. The storage 12b stores, for example, various application software. The application software stored in storage 12b includes various application software, such as map applications, music applications, weather applications, and a spread assist application as one of such applications. This spread assist application is an application that assists spreading by the spreader apparatus 1. That is, when the spread assist application is activated, the controller 12a of the infotainment system 12 functions as a controller of a spread assist device.

Figure 3:
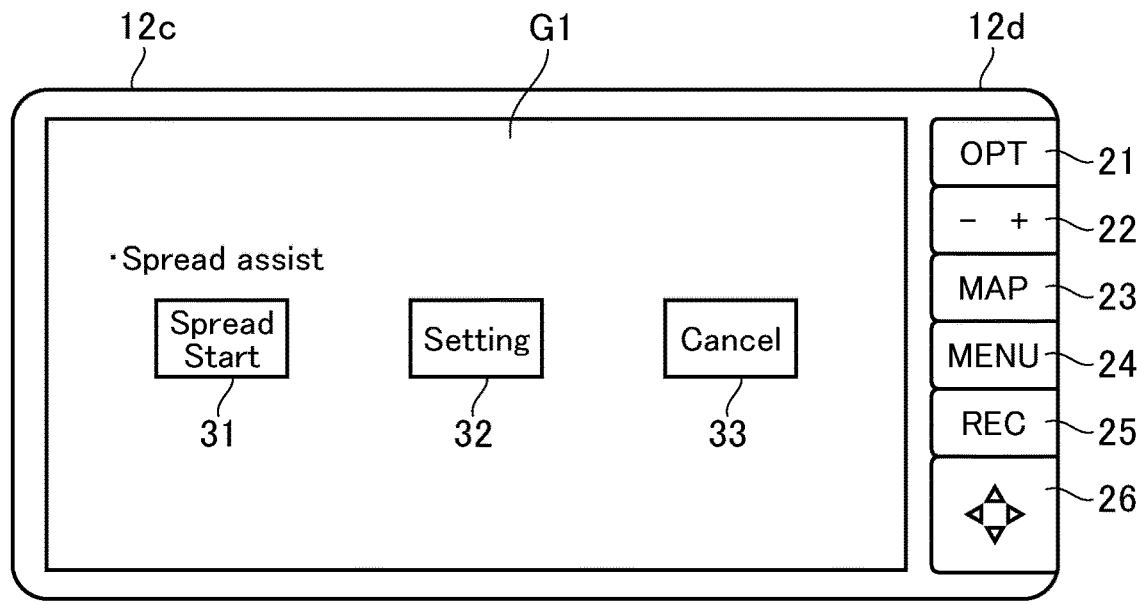
FIG. 3 is a diagram of a display of a spread assist device according to an embodiment, illustrating an example of a home screen G1 of a spread assist application displayed on the display.

The display 12c includes a touch panel capable of display and input. The input part 12d accepts inputs from the user. For example, as illustrated in FIG. 3, the input part 12d includes a plurality of input buttons and the like provided near the display 12c. The touch panel of the display 12c and the input part 12d function as a user interface that accepts inputs from the user.

FIG. 3 is a diagram illustrating the display 12c and the input part 12d of the infotainment system 12 according to an embodiment. The display 12c can display various screens in response to operations, and mainly displays the home screen, screens (application screens) corresponding to the applications, a settings screen, and so on individually. As illustrated in FIG. 3, the input part 12d of the infotainment system 12 has several input buttons (an option button 21, a zoom in/out button 22, a map button 23, a menu button 24, a record button 25, and a cross directional keypad 26).
(Spread Assist)

When the user operates the display 12c or the input part 12d of the infotainment system 12 to active the spread assist application, the controller 12a of the infotainment system 12 starts to function as the controller of the spread assist device and displays a home screen G1 of the spread assist application on the display 12c as illustrated in FIG. 3.

The home screen G1 of the spread assist application illustrated in FIG. 3 displays a spread start button 31, a settings button 32, and a cancel button 33. When the spread start button 31 is selected by the user, the controller 12a displays a spread assist screen G6 illustrated in FIG. 9 on the display 12c. When the setting button 32 is selected by the user, the controller 12a displays on the display 12c a spread assist setting screen G2 illustrated in FIG. 4. When the cancel button 33 is selected by the user, the controller 12a returns the screen displayed on the display unit 12c back to the screen displayed before the spread assist application is activated.

Next, a case where the user selects the spread start button 31 on the home screen G1 in FIG. 3 is described in detail.

When the user selects the spread start button 31 on the home screen G1 illustrated in FIG. 3, the controller 12a of the infotainment system 12 outputs a spread start signal. In response to the output of the spread start signal, the controller 2c of the spreader 2 controls the spread mechanism 2b to control the opening degree of the container 2a and start dropping the spreading object from the container 2a. Also, when the user selects the spread start button 31, the controller 12a of the infotainment system 12 starts to capture an image by the camera 4 and starts to generate a virtual overhead view image including a spread path or a passed route of the spreading that is being executed. The controller 12a of the infotainment system 12 then displays, based on the captured image captured by the camera 4 and the virtual overhead view image generated, the spread assist screen G6 illustrated in FIG. 9 on the display 12c.

Note that the captured image 91 (see FIG. 9) captured by the camera 4 displays the field behind the spreader apparatus 1 and thus displays the real-time status of the spreading object spread by the spreader apparatus 1. Therefore, the user can operate the spreader apparatus 1 (the traveling vehicle 3) while checking the spread status behind the spreader apparatus 1 in the traveling direction in real time, enabling a uniform spreading of the spreading object. The spread assist screen G6 illustrated in FIG. 9 displays a thumbnail 92 of the virtual overhead view image. When the user selects the thumbnail 92 using the touch panel function or the map button 23, the screen switches from the spread assist screen G6 in FIG. 9 to the spread assist screen G7 illustrated in FIG. 10.
(Virtual Overhead View Image)

The virtual overhead view image is generated as follows.

When the spread start button 31 is selected (i.e., when the controller 12a receives an instruction to generate the virtual overhead view image), the controller 12a obtains a spread width information (e.g., a numerical value of the spread width), stored in the storage 12b, indicating the spread width of the spreader apparatus 1 (the spreader 2), and also obtains tracking information, after the spread start button 31 is selected, of the detected position of the spreader apparatus 1 detected by the position detector 10. Then, the controller 12a generates the virtual overhead view image 100 (see FIG. 10) including the on-going spread path 101 based on the obtained spread width information and the obtained tracking information. In other words, in the generated virtual overhead view image 100 (see FIG. 10), the spread path 101 having the spread width of the spreader apparatus 1 is depicted along the passed route of the spreader apparatus 1.

Note that, as described above, the spread width information indicating the spread width of the spreader 2 is stored in the storage 12b. However, if the user wishes to change the spread width information, the user can select the setting button 32 on the home screen G1 illustrated in FIG. 3 to display the spread assist setting screen G2 illustrated in FIG. 4 or FIG. 5 to change the spread width information and save the changed spread width information therethrough.

Next, a case where the user selects the settings button 32 on the home screen G1 in FIG. 3 is described. When the user selects the setting button 32 on the home screen G1 illustrated in FIG. 3 as described above, it is determined whether or not the spread width information and the type of the spreading object are already stored in the storage 12b. If the controller 12a determines that the spread width information and the type of the spreading object are not stored in the storage 12b, the controller 12a displays the spread assist setting screen G2 illustrated in FIG. 4. If the controller 12a determines that the spread width information and the type of the spreading object are stored in the storage 12b, the controller 12a displays the spread assist setting screen G2 illustrated in FIG. 5, in which the stored spread width information and the stored type of the spreading object have already been entered.

Figure 4:
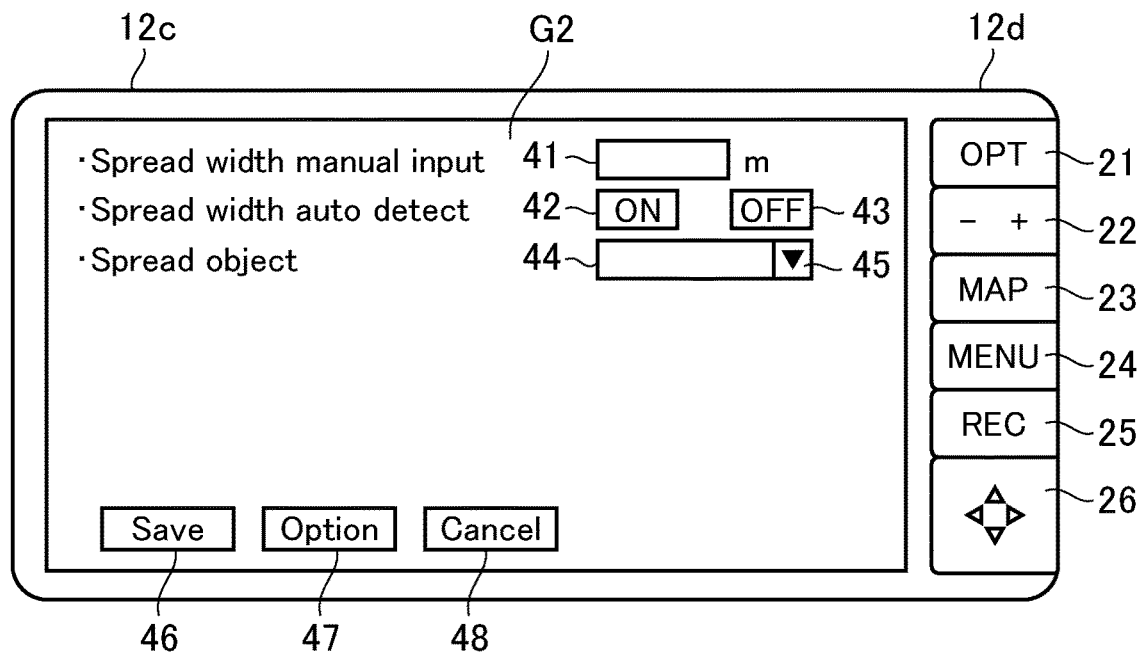
FIG. 4 is a diagram illustrating a spread assist setting screen G2 displayed on the display according to an embodiment.

The spread assist setting screen G2 illustrated in FIG. 4 displays a spread width input window 41 to receive an input, from the user, of a spread width of the spreading object to be spread from the spreader 2, an ON button 42 to turn on an automatic spread width detection, an OFF button 43 to turn off the automatic spread width detection, and an input window 44 to receive an input of a type of the spreading object, a save button 46, an option button 47, and a cancel button 48. In other words, the spread assist setting screen G2 illustrated in FIG. 4 is a screen that prompts the input of the spread width and the type of the spreading object to be spread for an upcoming spreading.

As illustrated in FIG. 4, the spread width input window 41 of the spread assist setting screen G2 can accept a manual input, from the user, of the spread width of the upcoming spreading to be performed by the spreader 2. Note that when a numerical value of the spread width is entered in the spread width input window 41, the controller 12a disables the ON button 42 and selects (enables) the OFF button 43. The unit of the spread width to be entered in the spread width input window 41 can be switched between meters, centimeters, inches, yards, and so on. On the other hand, when the ON button 42 is selected by the user, the controller 12a disables the spread width input window 41 and disable the OFF button 43. When the ON button 42 is selected, the controller 12a automatically detects the spread width of the on-going spreading performed by the spreader 2, instead of receiving the manual input of the spread width from the user. More specifically, when the ON button 42 is selected, the controller 12a performs image processing on the captured image, taken by the camera 4, behind the spreader apparatus 1 in the travel direction while the spreader is spreading, so as to detect (calculate) the spread width of the spreading object actually spread by the spreader apparatus 1. The spreading object type input window 44 can also accept an input from the user of the type of the spreading object to be used for the upcoming spreading. The spreading object type input window 44 is a so-called pull-down window. When an arrow icon 45 thereof is selected (tapped), the controller 12a displays names of multiple spreading objects in the pull-down window 49. When the user selects one of the spreading objects displayed in the pull-down window 49, the name of the selected spreading object is entered in the spreading object type input window 44. When the save button 46 is selected (tapped) by the user, the controller 12a saves the values entered in the spread assist setting screen G2 as the spread assist setting values and displays the home screen G1.

Figure 5:
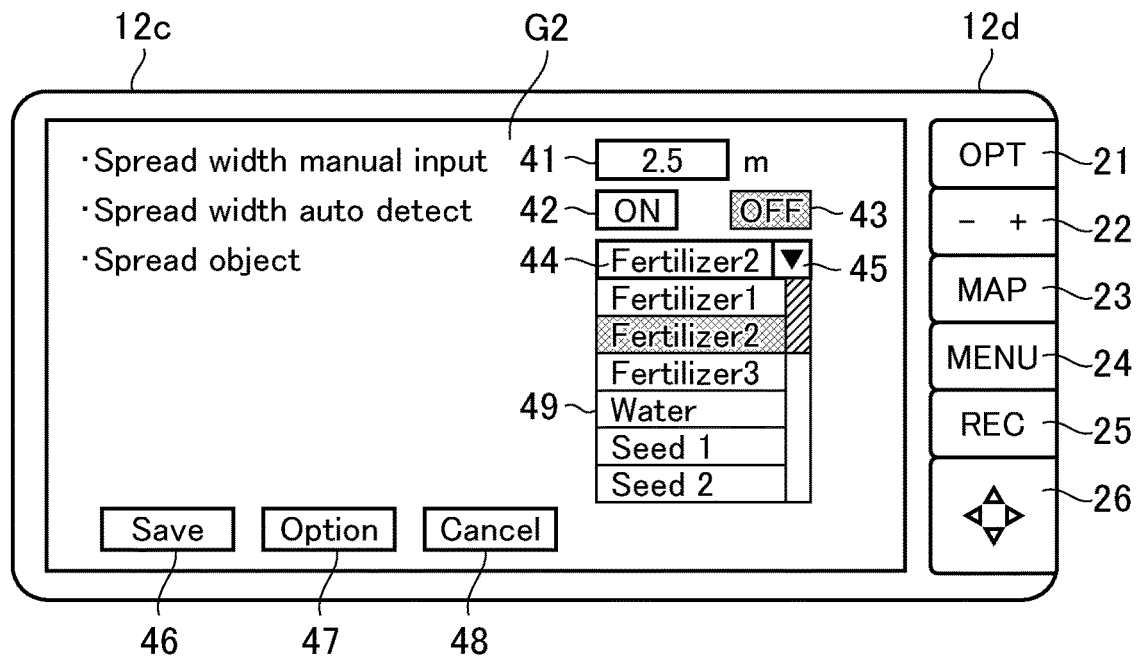
FIG. 5 is a diagram illustrating an input example of the spread assist setting screen G2 according to an embodiment.

Similar to the spread assist setting screen G2 illustrated in FIG. 4, the spread assist setting screen G2 illustrated in FIG. 5 is configured to prompt the user to enter the spread width and the type of the spread object to be spread for the upcoming spreading. The difference between the spread assist setting screen G2 illustrated in FIG. 5 and the spread assist setting screen illustrated in FIG. 4 is that the spread assist setting screen G2 illustrated in FIG. 4 is displayed when neither the spread width information nor the type of the spreading object to be spread is stored in the storage 12b, whereas the spread assist setting screen G2 illustrated in FIG. 5 is displayed when the spread width information and the type of the spreading object to be spread are stored in the storage 12b. In the spread assist setting screen illustrated in FIG. 5, the values stored in the storage 12b are input in the input windows 41 and 45 in advance. Therefore, if there is no need to change from the pre-stored values (e.g., the values used for the previous spreading), the input work is simplified; if there is a need to change from the pre-stored values (e.g., the values used for the previous spreading), the input windows 41 and 45 and the buttons 42 and 43 can be used to change the settings.

(Spread Assist Screen)

Figure 9:
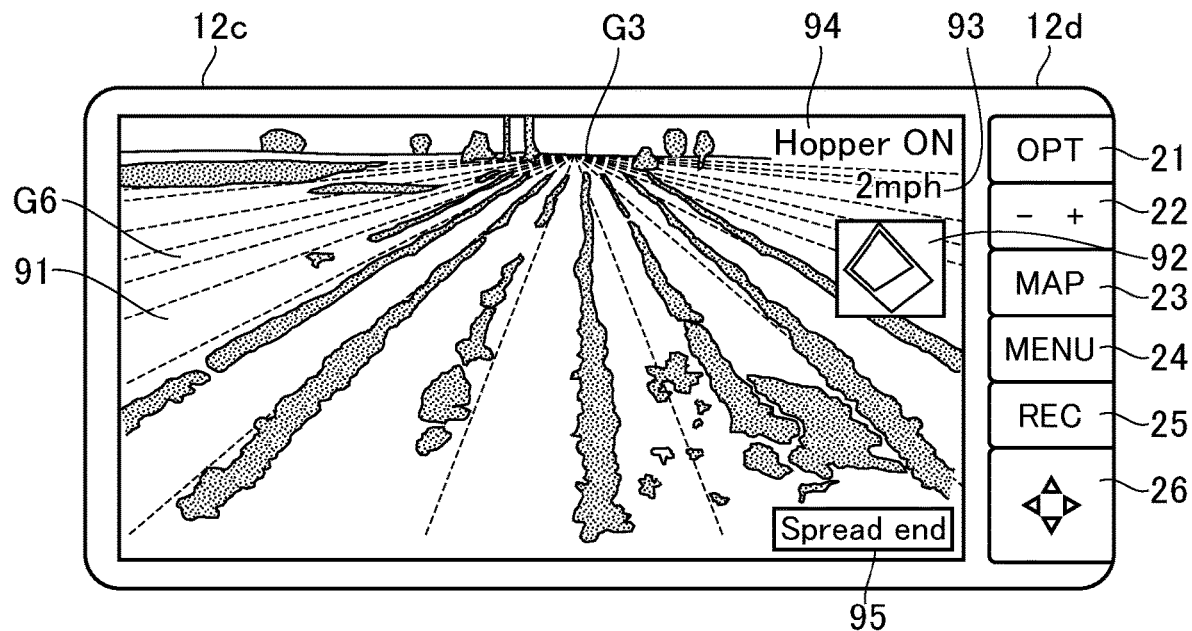
FIG. 9 is a diagram illustrating a spread assist screen G6, which displays a captured image, on the display according to an embodiment.
Figure 10:
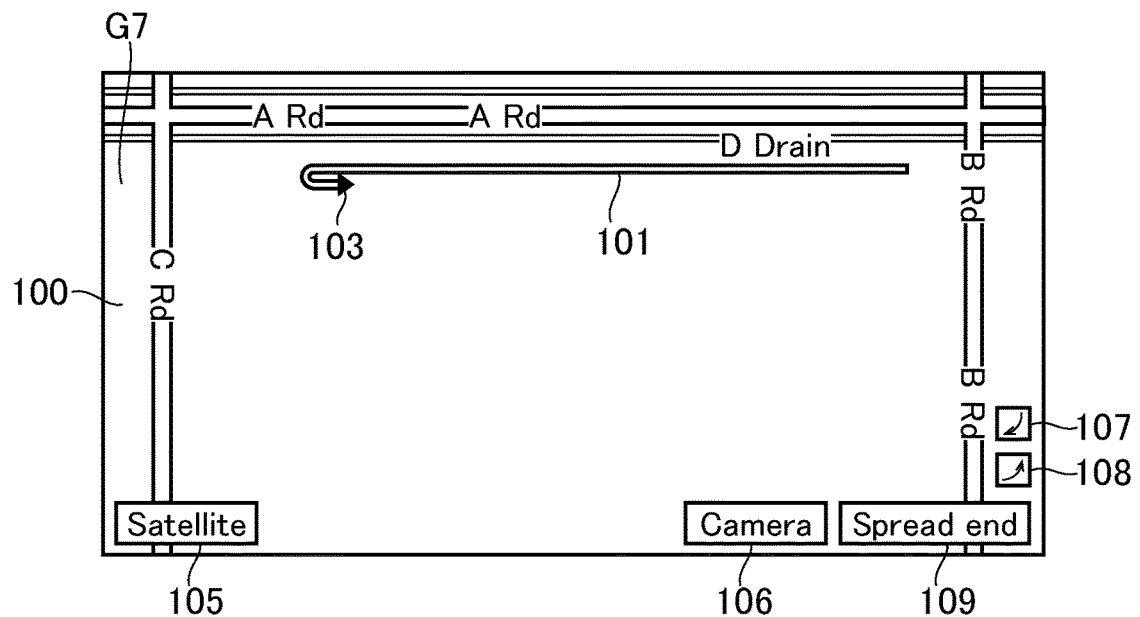
FIG. 10 is a diagram illustrating an example of a spread assist screen G7, which displays a virtual overhead view image, on the display according to an embodiment.
Figure 11:
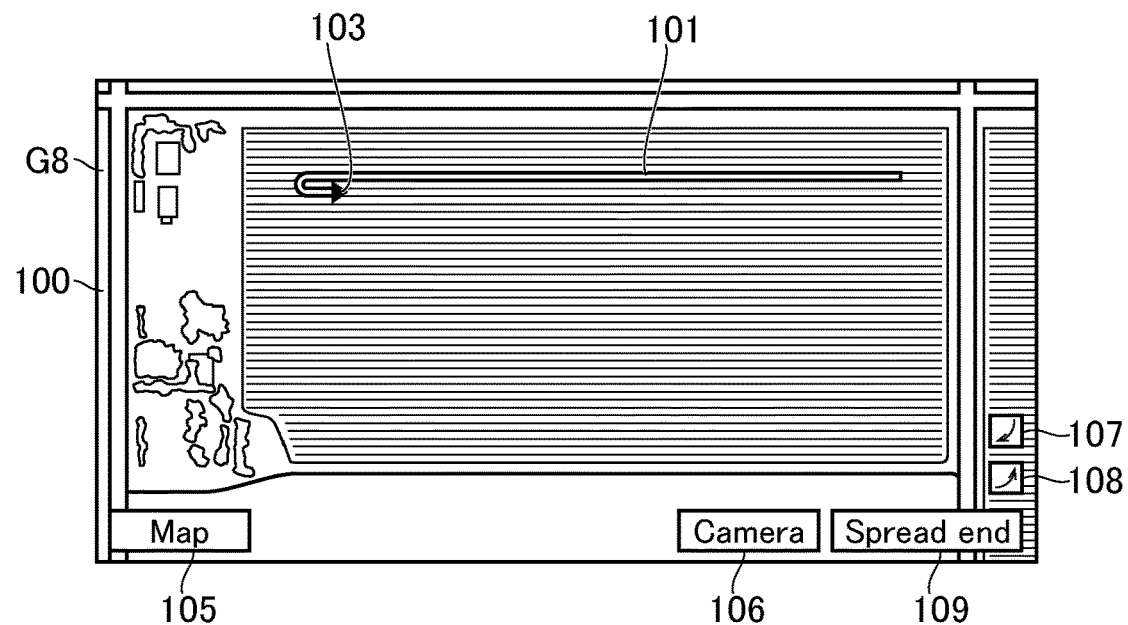
FIG. 11 is a diagram illustrating an example of a spread assist screen G8, which displays a virtual overhead view image, on the display according to an embodiment.

Next, the spread assist screens G6, G7, and G8 illustrated in FIGS. 9, 10, and 11 are described.

As mentioned above, when the user selects the spread start button 31 on the home screen G1 in FIG. 3, the spread assist screen G6 in FIG. 9 is displayed. From the spread assist screen G6, the user can switch to the spread assist screen G7 in FIG. 10 or the spread assist screen G8 in FIG. 11.

First, the spread assist screen G6 illustrated in FIG. 9 is described in more detail.

As described above, the spread assist screen G6 in FIG. 9 displays in real time the captured image 91, which is captured by camera 4, of the rear side of the spreader apparatus 1. This spread assist screen G6 displays the thumbnail 92 of the virtual overhead view image, a running speed indicator 93, a spread ON/OFF indicator 94, and the spreading end button 95 which are superimposed to each other. In other words, the controller 12a displays the captured image 91 with the thumbnail 92, the speed indicator 93, the spread ON/OFF indicator 94, and the spread end button 95 being superimposed on the captured image 91.

The thumbnail 92 is a reduced image (or a preview image) of the virtual overhead view image 100 that includes the on-going spread path 101. The speed indicator 93 indicates the current travel speed of the spreader apparatus 1. A past speed indicator, which indicates a travel speed of the spreader apparatus during a past spreading (e.g., the previous spreading or one of the past spreading selected by the user), may be displayed in parallel with the speed indicator 93. The spread ON/OFF indicator 94 indicates whether or not spreading is being performed by the spreader 2 (whether or not dropping the spreading object is being performed). When the spreading is being performed by the spreader 2, the ON/OFF indicator 94 displays "Hopper ON", and when the spreading is not being performed by the spreader 2, the ON/OFF indicator 94 disappears or displays "Hopper OFF." The spread end button 95 is a button to accept an instruction from the user to terminate the spreading.

On the spread assist screen G6 in FIG. 9, if the user selects the thumbnail 92 using the touch panel function or selects the map button 23 of the input part 12d, the screen is switched to the spread assist screen G7 which displays the virtual overhead view image 100 illustrated in FIG. 10.

In the spread assist screen G7 of FIG. 10, the virtual overhead view image 100 including the on-going spread path 101 is displayed. This virtual overhead view image 100 displays the spreader apparatus indicator 103 as well as the on-going spread path 101. The spreader apparatus indicator 103 virtually indicates the current position of the spreader apparatus 1 on the virtual overhead view image 100, based on the current position of the spreader apparatus 1 detected by the position detector 10. For example, a display position of the spreader apparatus indicator 103 in the spread assist screen G7 is fixed.

A map image serving as an overhead view image is superimposed (displayed in layers) on the virtual overhead view image 100 illustrated in FIG. 10. The map image is a map image of the area around the current position of the spreader apparatus 1, which is detected by the position detector 10. On the spread assist screen G7 illustrated in FIG. 10, a layer switching icon 105 for switching the layer from the map image to an overhead photo image (such as a satellite photo, an aerial photo, and a drone photo) is displayed. When the layer switching icon 105 is selected by the user on the spread assist screen G7 illustrated in FIG. 10, the screen is switched to the spread assist screen G8 illustrated in FIG. 11.

In addition, on each of the spread assist screen G7 illustrated in FIG. 10 and the spread assist screen G8 illustrated in FIG. 11, a camera button 106 is displayed. When the user selects the camera button 106, the screen switches to the spread assist screen G6 illustrated in FIG. 9. In addition, in each of the spread assist screen G7 illustrated in FIG. 10 and the spread assist screen G8 illustrated in FIG. 11, a right rotation icon 107 and a left rotation icon 108 are displayed to rotate the virtual overhead view image 100 in the clockwise direction and the counterclockwise direction by 90 degrees, respectively. In addition, in each of the spread assist screen G7 illustrated in FIG. 10 and the spread assist screen G8 illustrated in FIG. 11, a spread end button 109 is displayed to accept an instruction from the user to terminate the spreading.

(Zoom In/Out)

When the zoom in/out button 22 in the input part 12 is operated with the spread assist screen G6 illustrated in FIG. 9, the spread assist screen G7 illustrated in FIG. 10, or the spread assist screen G8 illustrated in FIG. 11 being displayed, the controller 12a is configured to zoom in or out the displayed image.

Figure 12:
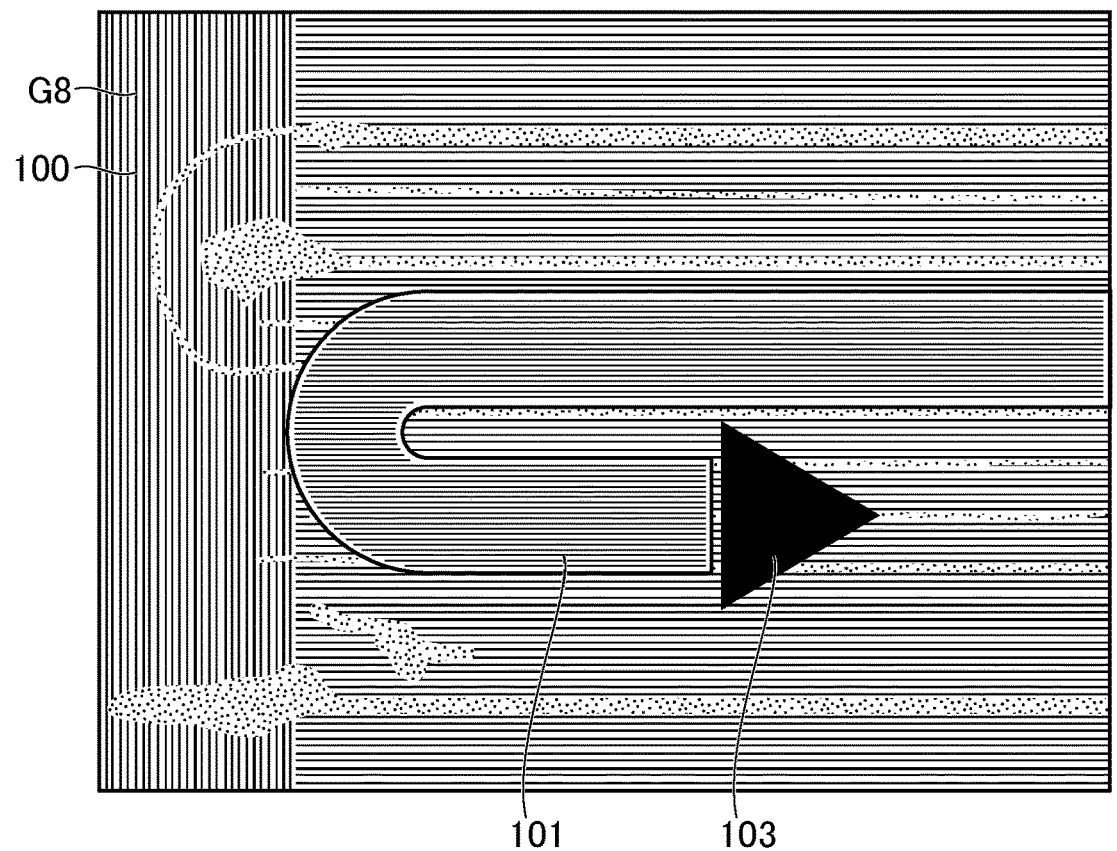
FIG. 12 is a diagram illustrating an example of an enlarged view of a virtual overhead view image according to an embodiment.

For example, FIG. 12 is a diagram illustrating an example in which the virtual overhead view image 100 is enlarged by operating the zoom in/out button 22 from the spread assist screen G8 illustrated in FIG. 11. As illustrated in FIG. 12, in the enlarged view, the on-going spread path 101 and the spreader apparatus indicator 103 are displayed.

(Display Appearance of Spread Path)

Further in an embodiment, the controller 12a also generates the virtual overhead view image 100 in such a manner that a display appearance of the spread path 101 varies according to a spread density of the spreading object. For example, the controller 12a obtains the travel speed of the spreader apparatus 1 (the vehicle 3) from the vehicle speed sensor, calculates the spread density based on the travel speed, and displays the spread path 101 in such a manner that portions of the spread path 101 where the spread density is lower (where the travel speed is higher) is displayed in a lighter color and portions of the spread path 101 where the spread density is higher (where the travel speed is lower) is displayed in a darker color.

Figure 13:
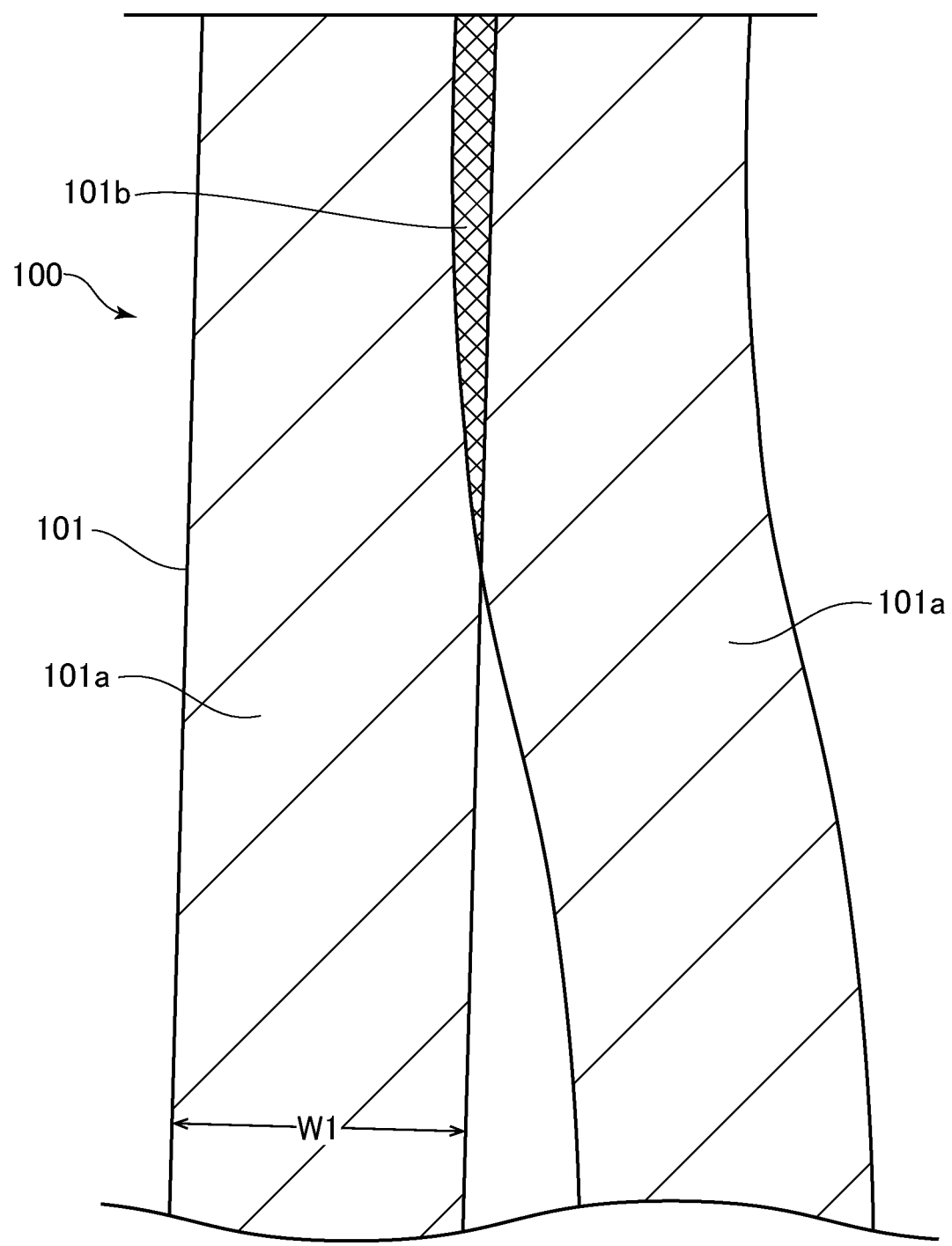
FIG. 13 is a diagram illustrating an example of a virtual overhead mage displayed on the display according to an embodiment, in which parts of a spread path are overlapped with each other.

Further in an embodiment, as illustrated in FIG. 13, the controller 12a generates the virtual overhead view image 100 in such a manner that a display appearance of a portion 101b of the spread path 101 that overlaps with another portion of the spread path 101 is different from a display appearance of a portion 101a of the spread path 101 that do not overlap with the other portions. That is, even in this case, the controller 12a generates the virtual overhead view image 100 such that the display appearance of the spread path 101 varies according to the spread density. This allows the user to immediately recognize when portions of the spread path 101 overlap with each other, thus avoiding an unintended continuation of such an overlapping spreading.

(Display of Past Spreading History)

Figure 14:
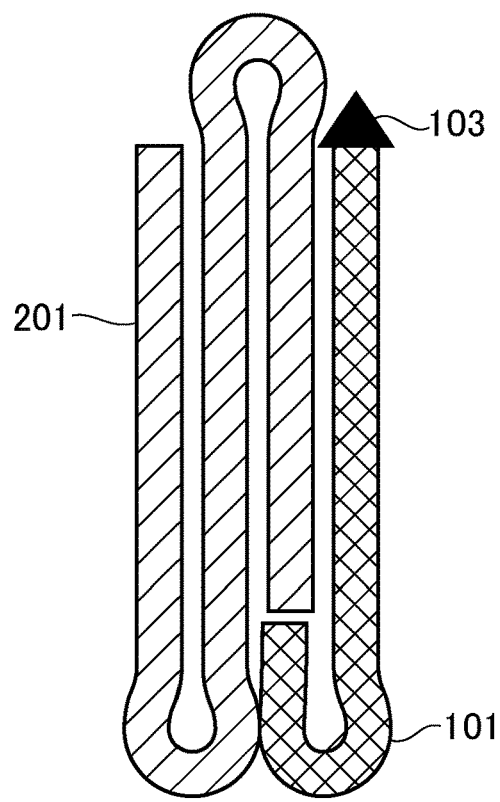
FIG. 14 is a diagram illustrating an example of a virtual overhead view image displayed on the display according to an embodiment, in which a spread path that is being executed and a past spread path(s) are displayed with being superimposed.

Further in an embodiment, as illustrated in FIG. 14, one or more past spread paths 201 can be superimposed on the on-going spread path 101 in the virtual overhead view image 100.

First, a selection of a past spread path(s) to be displayed is described. If the user wants to display a past spread path(s), the user selects the option button 47 on the spread assist setting screen G2 illustrated in FIG. 4 to display the option screen G3 illustrated in FIG. 6, and then selects the setting button 61 on the option screen G3 illustrated in FIG. 6 to display the past spread path selection screen G4 illustrated in FIG. 7. The past spread path selection screen G4 illustrated in FIG. 7 displays plural past spreading histories around the current position of the spreader apparatus 1 which is detected by the position detector 10. From the plural past spreading histories displayed in the past spread path selection screen G4 illustrated in FIG. 7, the user selects a past spread path(s) that the user wants to display by using checkboxes thereon. Then, when the user selects the OK button 73, the screen returns to the previous screen (the option screen illustrated in FIG. 6), and the past spread path(s) selected in the past spread path selection screen G4 illustrated in FIG. 7 is stored in the storage 12b as the past spread path(s) to be displayed in the virtual overhead view image 100.

Figure 15:
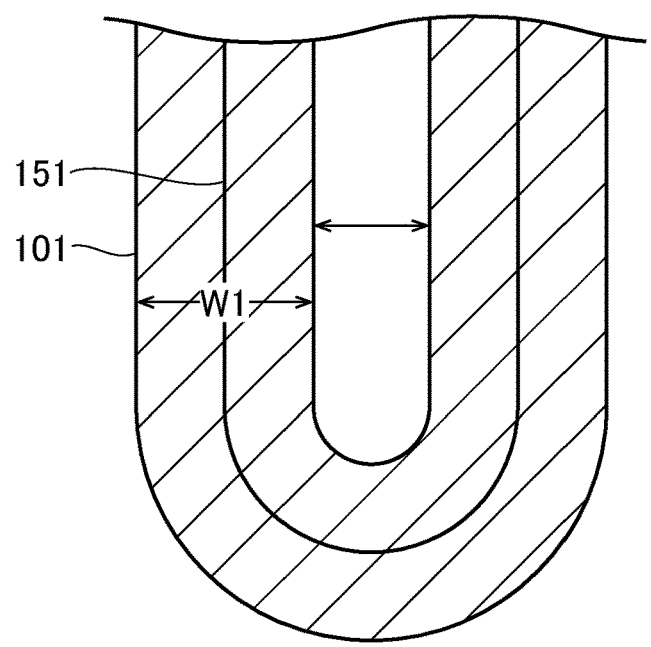
FIG. 15 is a diagram illustrating an example of a variation of a virtual overhead view image displayed on the display according to an embodiment, in which a spread path which is being executed is displayed with a center line thereof.
Figure 16:
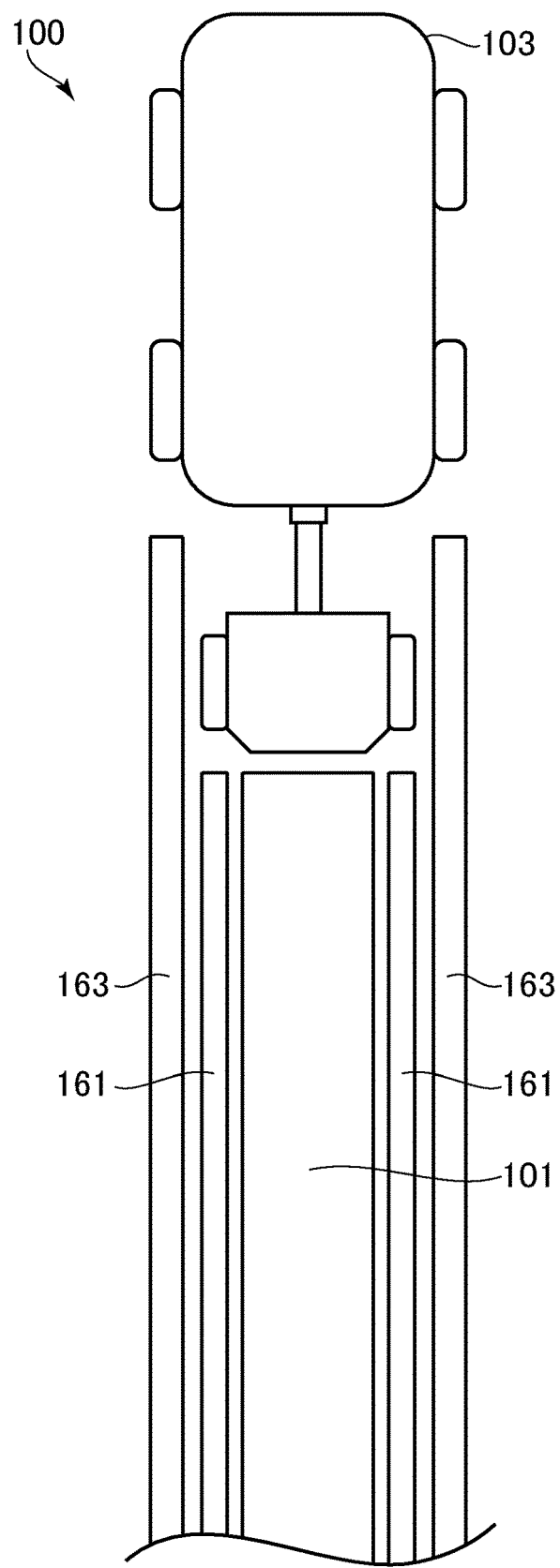
FIG. 16 is a diagram illustrating an example of the virtual overhead view image according to an embodiment, in which a spread path which is being executed and passed routes of wheels of the spreader apparatus are displayed with being superimposed.

When one or more past spread paths to be displayed in the virtual overhead view image 100 are stored in the storage 12b as described above, the controller 12a generates the virtual overhead view image 100 that includes the on-going spread path 101 and the one or more past spread paths 201 superimposed on the on-going spread path 101 (see FIG. 15).

In this case, the controller 12a displays the on-going spread path 101 and one or more past spread paths 201 in display appearances different from one another (for example, in different colors) in the virtual overhead view image 100.

Upon displaying plural past spread paths 201 on the virtual overhead view image, the controller 121a displays each of the plural past spread paths 201 in different display appearances (e.g., different colors, different patterns, etc.) depending on the type of the spreading object. For example, different colors are used for different types of the spreading objects. In this case, for example, the past spread path of a first fertilizer (fertilizer1) is set to blue, the past spread path of a second fertilizer (fertilizer2) to set to light blue, the past spread path of a first seed (seed1) to flesh color, and so on.

In this way, the controller 12a generates the virtual overhead view image in which the on-going spread path and the past spread path(s) are superimposed, and displays the virtual overhead view image on the display 12c. With this, the user can perform the spreading operation of the spreading object while referring to the past spread path(s) 201.

FIG. 15 is an enlarged view of the virtual overhead view image 100 in which the on-going spread path 101 and one past spread path 201 are superimposed. With the past spread path 201 being displayed in such a way, the user can start the current spreading, for example, from the end position of the past spread path 201, as illustrated in FIG. 15. Also, with the past spread path 201 being displayed, the user can perform a water spreading or a fertilizer spreading so as to overlap with the past spread path 201 of a seed, for example.

(End of Spreading)

When the user selects the spread end button 95 on the spread assist screen G6, the spread end button 109 on the spread assist screen G7 or the spread end button 109 on the spread assist screen G8, the spreading is terminated. In other words, when the user selects the spread end button 95 or 109, the controller 12a of the infotainment system 12 generates a spread end signal to terminate the spreading, terminates the generation of the virtual overhead view image 100 including the spread path 101, and saves in the storage 12b the data related to the generated spread path 101 (the date and time of the spreading, the type of the spreading object, the traveling speed, the spread path, etc.) as a past spreading history. When receiving the spread end signal, the controller 2c of the spreader 2 controls the spread mechanism 2b to stop dropping of the spreading object from the container 2a.

(Spread Planning)

Next, a case of setting a spread plan in the spread assist application is described.

Figure 6:
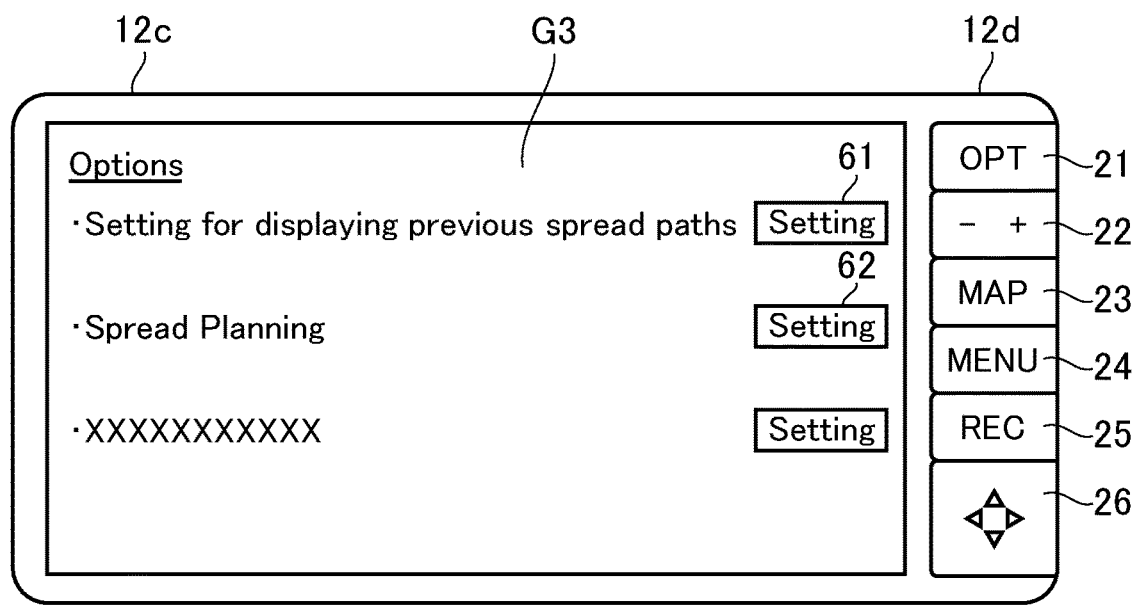
FIG. 6 is a diagram illustrating an option screen G3 displayed on the display according to an embodiment.
Figure 7:
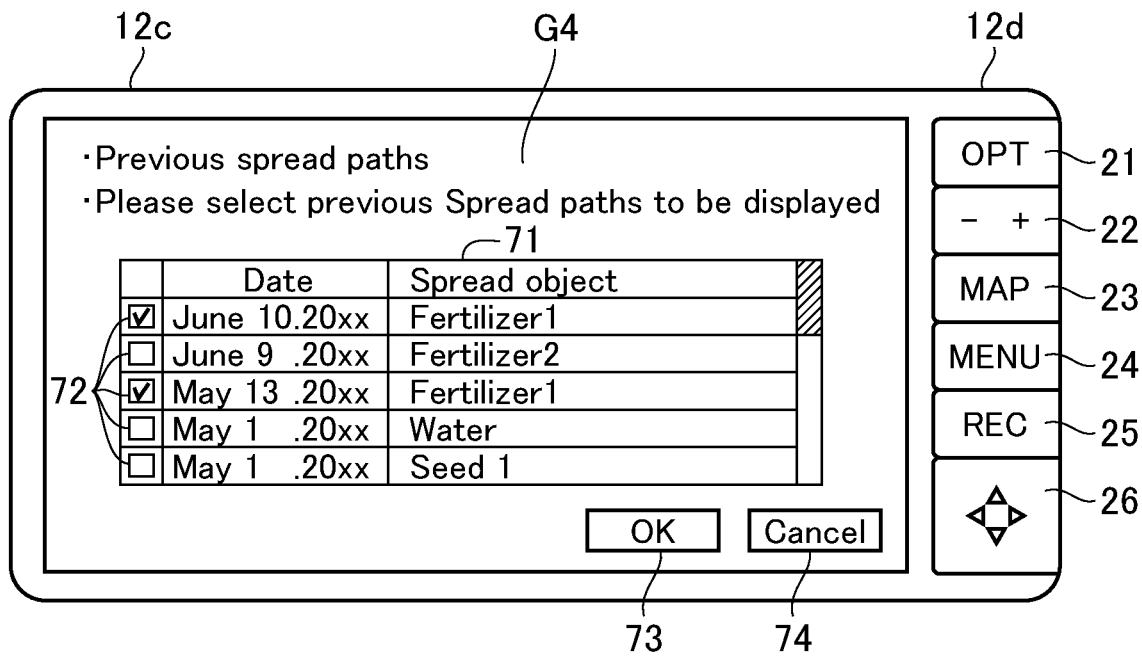
FIG. 7 is a diagram illustrating a past spread path selection screen G4 displayed on the display according to an embodiment.
Figure 8:
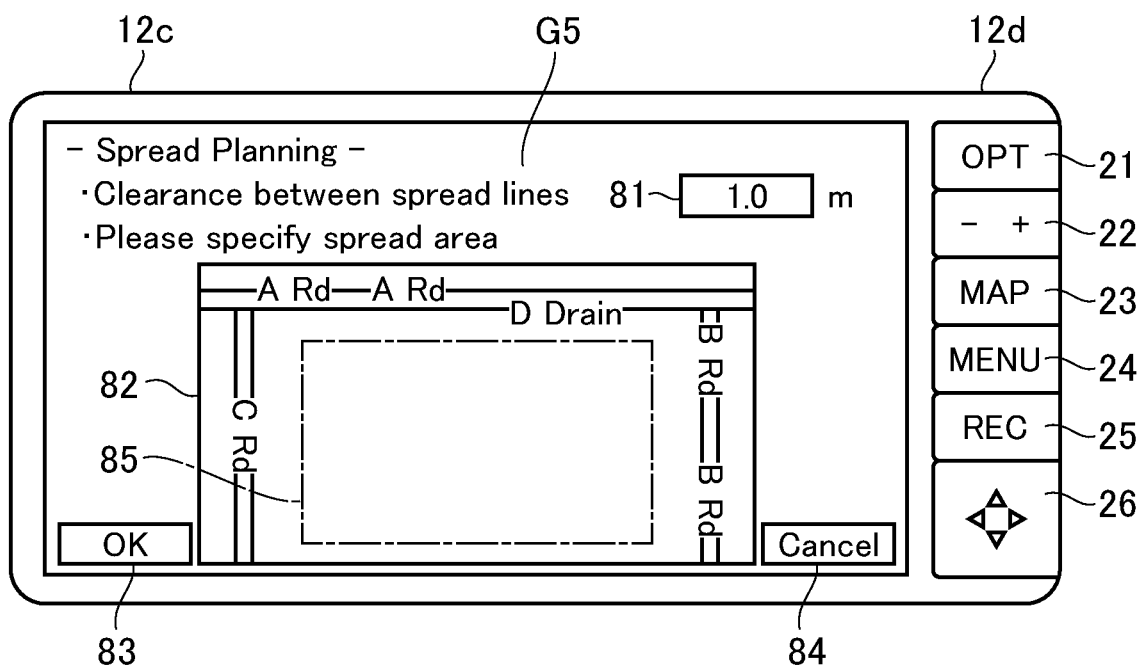
FIG. 8 is a diagram illustrating a spread planning screen G5 displayed on the display according to an embodiment.

When the user selects the setting button 62 for a spread planning on the option screen G3 illustrated in FIG. 6, the controller 12a displays a spread planning screen G5 illustrated in FIG. 8. The spread planning screen G5 is a screen that prompts the user to enter spread plan information. The spread planning screen G5 includes a clearance input window 81 that accepts an input of a clearance value between adjacent two spread lines for the upcoming spreading, a planed spreading area input field 82 that accepts an input of a planned spreading area, an OK button 83, and a cancel button 84. In the planed spreading area input field 82, an overhead view image 82 (a map image or an overhead photo image (a satellite photo, an aerial photo, a drone photo)) of the area around the current location of the spreader apparatus 1, which is detected by the position detector 10. On this overhead view image 82 (the map image or the overhead photo image), the user can specify a range using the touch panel function, so as to determine the planned spreading area 85. Then, when the OK button 83 is selected in a state where a clearance value (in this example, 1.0 m) is entered in the clearance input window 81 and the planned spreading area 85 is specified in the planned spreading area input field 82, the input clearance value and the coordinates of the planned spreading area 85 are set and saved as the spread plan information. If the cancel button 84 is selected on the spread planing screen G5 illustrated in FIG. 8, the spread plan information is not saved and the screen returns to the previous screen (i.e., the option screen G3 illustrated in FIG. 6).

Thus, once the spread plan information is set, the controller 12a generates a recommended spread path for the spreader apparatus 1 to pass through. Then, when the generation of the virtual overhead view image 100 is started, the controller 12a starts to generate the virtual overhead view image 100 including the recommended spread path 171 in addition to the on-going spread path 101 and displays the generated virtual overhead view image 100 on the display 12c, as illustrated in FIG. 17.

Figure 17:
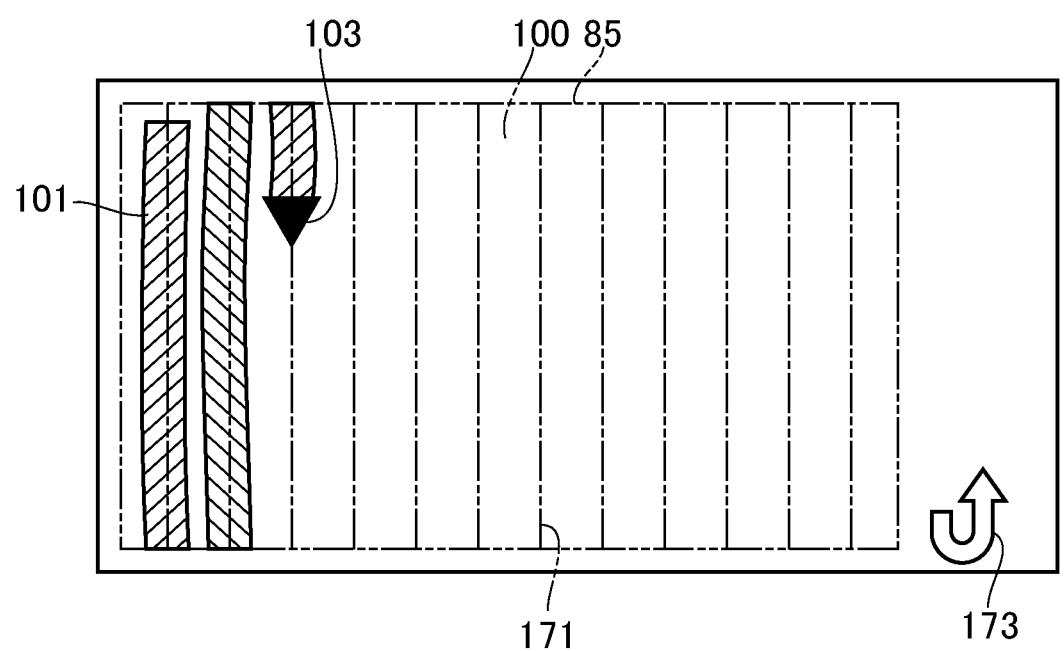
FIG. 17 is a diagram illustrating a view of an example of a virtual overhead view image according to an embodiment, in which a spread path which is being executed and a recommended spread path generated based on an input through the spread plan information input screen are displayed with being superimposed.

When the spreader apparatus 1 approaches an outer edge of the planned spreading area 85, the controller 12a displays a turning indicator 173 being superimposed on the virtual overhead view image 100 as illustrated in FIG. 17. For example, the turning indicator 173 is configured to flash, which allows the user to prevent the spreader apparatus 1 from largely protruding the planned spreading area 85.

When the controller 12a detects that the spreader apparatus 1 has moved out of the planned spreading area 85, the controller 12a sends a spread pause signal to the controller 2c of the spreader 2. When receiving the spread pause signal, the controller 2c of the spreader 2 temporarily stops dropping the spreading object from the container 2a. When the controller 12a detects that the spreader apparatus 1 has entered from the outside into the planned spreading area 85, the controller 12a sends a spread resume signal to the controller 2c of the spreader 2. When receiving the spread resume signal, the controller 2c of the spreader 2 resumes dropping the spreading object from the container 2a. This can eliminate the user to instruct to pause and resume dropping the spreading object from the spreader apparatus 1 in the vicinity of the outer edge of the planned spreading area. Also, this can reliably prevent unnecessary dropping of the spreading object.

Note that in an embodiment described above, the input of the spread plan information is accepted through the spreading planing screen G5 displayed on the display 12c of the infotainment system 12. However, it may be possible to accept an input of such spread plan information from a server or a PC connected via a network.

(Effects)

Effects of one or more embodiments described above are described below.

The spread assist device according to an embodiment includes the camera 4 as the image capturing device configured to capture the image of the field behind the spreader apparatus 1 in the traveling direction of the spreader apparatus 1, and the controller 12a, wherein the controller 12a is configured to display, on the display 12c, the captured image 91 captured by the camera 4 while the spreader apparatus 1 is traveling. Thus, the user can check the status of the on-going spreading on the display 12c while performing the spreading operation. This allows the user to check the spread status without having to get off the spreader apparatus 1.

The spread assist device according to an embodiment includes the position detector 10 configured to detect the position of the spreader apparatus 1 and the controller 12a, wherein the controller 12a is configured to: (i) acquire the spread width information indicating the spread width W1 of the spreading object to be spread from the spreader apparatus 1; (ii) acquire the tracking information of the detected position of the spreader apparatus 1 detected by the position detector 10 after detecting the start of spreading by the spreader apparatus 1; generate, based on the acquired spread width information and tracking information, the virtual overhead view image 100 including the on-going spread path 101 having the spread width W1; and display the generated virtual overhead view image 100 in at least a portion of the display 12c.

Therefore, the user can perform the spreading operation while viewing the virtual overhead view image 100 which includes the on-going spread path 101 on the display 12c. This allows the user to check the spread status without having to get off the spreader apparatus 1.

In addition, the spread path 101 displayed by the virtual overhead view image 100 has a width corresponding to the spread width of the spreader apparatus 1 (the spreader 2). Thus, the user can grasp the spread path more accurately, enabling more uniform spreading of the spreading object.

Further in an embodiment, the controller 12a acquires the overhead image (the map image, or the overhead photo images (the aerial photo, the satellite photo, the drone photo)) of the area around the current position of the spreader apparatus 1, and displays the acquired overhead image (the map image, or the overhead photo images (the aerial photo, the satellite photo, the drone photo)) superimposed on the virtual overhead view image 100. This makes it easy to confirm the location of the spread path using the map image, the overhead photo image (the aerial photo, the satellite photo, the drone photo), or the like, which further improves the efficiency of the spreading operation.

Further in an embodiment, the controller 12a also generates, based on the current position of the spreader apparatus 1 detected by the position detector 10, the spreader apparatus indicator 103 that indicates the current position of the spreader apparatus 1, and superimposes the spreader apparatus indicator 103 on the virtual overhead view image 100. Therefore, by the spreader apparatus indicator 103, which indicates the current position of the spreader apparatus 1, it easy to check the positional relationship between the current position of the spreader apparatus 1 and the spread path 101, which further improves the efficiency of the spreading operation.

Further in an embodiment, the controller 12a generates the virtual overhead view image 100 such that the display appearance of the spread path 101 varies according to the spread density of the spreading object. This makes it possible, for example, to reapply spreading in an area where the spread concentration is low, thus enabling more uniform spreading.

Further in an embodiment, the controller 12a generates the virtual overhead view image 100 such that the display appearance of the portion 101b of the spread path 101 that overlaps with anther portion of the spread path 101 and the display appearance of the portion 101a of the spread path 101 that does not overlap with the other portion are different from each other. This allows the user to immediately recognize portions of the spread path 101 are overlapped with each other, effectively avoiding overlapped spreading.

Further in an embodiment, the controller 12a displays the speed indicator 93 indicating the travel speed of the spreader apparatus 1 and the ON/OFF indicator 94 indicating whether or not the spreader apparatus 1 is currently dropping the spreading object. Therefore, it possible to perform the spreading operation while checking the status of the spreading by the spreader apparatus 1, which improves convenience.

Note that, in addition to the speed indicator 93 and the ON/OFF indicator 94, other indications such as a travel direction of the spreader apparatus 1, coordinates of the spreader apparatus 1, etc. may be displayed.

Further in an embodiment, the controller 12a displays, based on the user's selection, one of the captured image 91 (see FIG. 9) and the virtual overhead view image 100 (see FIGS. 10 and 11), on the display 12c. This allows the user to select and display the captured image 91 or the virtual overhead view image 100, as appropriate to the situation, for more efficient spreading.

Further in an embodiment, the controller 12a is configured, based on the user input, to enlarge and reduce the captured image 91 or the virtual overhead view image 100 displayed on the display 12c. This further enhances user convenience.

Further in an embodiment, the controller 12a determines the spread width of the spreader apparatus 1 based on the spread width information (e.g., numerical value of the spread width) received at the user interface. Therefore, even if the spread width information that determines the spread width is not stored in advance in the storage (e.g., 12b) in the spreader apparatus 1, it is possible to generate the virtual overhead view image 100 including the spread path 101 having the spread width W1.

Further in an embodiment, the controller 12a processes the captured image 91 captured by the camera 4 and obtains the spread width of the spreader apparatus 1. Therefore, it is possible to obtain the spread width specific to the spreader apparatus 1 without the user having to manually input the spread width information (e.g., numerical value of the spread width), which increases the user's convenience.

Further in an embodiment, the controller 12a acquires one or more past spreading histories around the current position of the spreader apparatus 1, and superimposes, based on the acquired one or more past spreading histories, the past spreading information (e.g., past spread path(s)) on the virtual overhead view image. This allows the user to perform the spreading operation while checking the past spreading information, which further improves the spreading efficiency.

Note that in an embodiment described above, a case has been described in which the past spread information superimposed on the virtual overhead view image is the past spread path(s) having the spread width(s). However, other past spread information, such as the date and time of the spreading, the travel speed, the type of spreading object, etc., may be used as the past spread information.

Further in an embodiment, the controller 12a displays the plural past spread paths in display appearances different from each other (e.g., different colors) according to the types of the spreading objects. With this allows for a more specific understanding of the plural past spread paths, including the types of the objects being spread.

Further in an embodiment, the user interface (the input part 12d, the touch panel 12c, and the like) is further provided to accept input for the start of the spreading by the spreader apparatus 1, and the controller 12a is configured, in response to receiving the input of the start of the spreading through the user interface, to start generating the virtual overhead view image 100 including the spread path 101. Therefore, the virtual overhead view image starts to be generated without the user having to separately input the start of spreading and the start of generating the virtual overhead view image, which improves the user's convenience.

Further in an embodiment, upon the end of generating the virtual overhead view image 100 including the spread path 101, the controller 12a stores the generated data of the spread path 101 in the storage 12b as a past spreading history. Therefore, the stored spreading history can be used for a feature spreading, which further enhances the user's convenience.

Further in an embodiment, the controller 12a displays the spread planing screen G5 (FIG. 8), which prompts the input of the spread plan information, generates a recommended spread path for the spreader apparatus 1 to pass based on the inputted spread plan information, and superimposes the recommended spread path 171 on the virtual overhead view image 100. This allows the user to follow the recommended spread path so as to perform uniform spreading, which further improves the efficiency of the spreading operation.

Further in an embodiment, the controller 12a accepts input of the planned spreading area 85, and when the controller 12a determines, based on the inputted planned spreading area 85 and the current position of the spreader apparatus 1 detected by the position detector 100, that the spreader apparatus 1 has approached the outer edge of the planned spread area 85, the controller 12a displays the turning indicator 173 to prompt to turn the spreader apparatus 1. This prevents the user from operating the spreader apparatus 1 far beyond the planned spreading area 85.

Further in an embodiment, when detecting that the spreader apparatus 1 has moved out the planned spreading area 85 from the inside thereof, the controller 12a sends the spreading pause signal to thereby stop the spreading of the spreading object from the spreader apparatus 1, and when detecting that the spreader apparatus 1 has entered into the planned spreading area 85 from the outside thereof, the controller 12a sends the spreading resume signal to thereby resume the spreading of the spreading object from the spreader apparatus 1. This can eliminate the user to instruct the spreader apparatus 1 to pause and resume dropping the spreading object from the spreader apparatus 1 in the vicinity of the outer edge of the planned spreading area.

(Modifications of Virtual Overhead View Image)

As illustrated in FIG. 15, the controller 12a may display, based on the tracking information of the detected position of the spreader apparatus 1, a center line 140 in the center of the spread path 101 in the width direction, as a modification of the virtual overhead view image. With the center line 151 of the spread path 101 being displayed in this way, the user can more easily operate the spreader apparatus 1.

In an embodiment described above, the virtual overhead view image 100 displays the spread path 101 of the spreading object, but may further display, in addition to the spread path 101, passed routes of the wheels of the spreader apparatus 1 (passed routes 161 of the wheels 2w of the spreader 2 and/or passed routes 163 of the wheels 3w of the vehicle 3). That is, the controller 12a may generate, based on the tracking information and the positional relationship between the position detector 100 and the wheels 2w of the spreader 2 and the wheels 3w of the vehicle 3 that are stored in advance, the virtual overhead view image 100 including the spread path 101 of the spreading object and the passed routes 161 and 163 of the wheels of the spreader apparatus 1. In this case, the user can perform the spreading operation of the spreading object more accurately, with viewing on the display 12c the spread path 101 of the spreading object and the passed routes 161 and 163 of the wheels 2w and 3w of the spreader apparatus 1.

As another modification of the virtual overhead view image, the controller 12a may monitor the output from the controller 2c of the spreader 2 or the output from a spreading object remaining amount sensor of the spreader 2, and display, in response to detecting there is no more spreading object in the container 2*a* of the spreader 2, a mark indicating the end of spreading at a corresponding position in the virtual overhead view image.

(Oher Modifications)

Embodiments disclosed herein should be considered in all respects illustrative and not restrictive. The scope of the invention is indicated by the claims, not by the above description, and is intended to include all modifications and variations within the meaning and scope equivalent to the claims.

In an embodiment described above, a case has been described in which when the controller 12*a* of the infotainment system 12 outputs, in response to accepting the user's instruction to start/end the spreading, the spread start signal/spread end signal. However, the invention is not limited thereto. For example, the controller 2*c* of the spreader 2 may be configured to output a spread start signal and a spread end signal when the controller 2*c* of the spreader 2 receives a user instruction to start/end the spreading through a user interface provided in the spreader 2, a user interface provided in the vehicle 3, or a user interface provided outside the spreader apparatus 1. In this case, for example, the controller 12*a* of the infotainment system 12 is configured, upon receiving the spread start signal output from the controller 2*c* of the spreader 2, to start generating the virtual overhead view image.

Further in an embodiment described above, the apparatus is configured to start and end the spreading by the spreader 2 in response to the spread start signal and the spread end signal respectively. However, the invention is not limited thereto. For example, the shutter of the container 2*a* may be opened to start the spreading in response to a user's operation of a lever or other device provided at the spreader 2. Further, the apparatus may have a structure such that, for example, when the wheels 2*w* of the spreader 2 rotate, the spreading object in the container 2*a* is sent out of the container in conjunction with the rotation of the wheels 2*w*, so as to spread the spreading object. In this case, for example, the controller 12*a* is configured to display a button for generating a spread assist image instead of the spread start button 31 on the home screen G1 illustrated in FIG. 3, and in response to the user selection of the spread assist image generation button, start capturing the image by the camera 4 and start generating the virtual overhead view image 100, and then displays the spread assist screen G6, G7, or G8 on the display 12*c*. In this case, the controller 12*a* also is configured to display a spread assist image generation end button instead of the spread end button 95, 109 on the spread assist screen G6 of FIG. 9 and the spread assist screens G7 and G8 of FIG. 10 and FIG. 11, and to terminate, in response to a user selection of the spread assist image generation end button, capturing by the camera 4 and generation of the virtual overhead view image 100.

Further in an embodiment described above, a case has been described in which the controller 12*a* obtains the spread width input through the display 12*c* (the touch panel) or the input part 12*d* of the infotainment system 12, and a case has been described in which the controller 12*a* obtains the spread width by processing the captured image captured by the image capturing device 4. However, the invention is not limited to thereto. For example, the controller 12*a* of the infotainment system 12 may obtain the spread width of the spreader 2 from the memory (not illustrated) installed in the spreader 2 or from the controller 2*c* of the spreader 2.

Further in an embodiment described above, a case has been described in which, when the spread assist application is activated, the home screen G1 of the spread assist application illustrated in FIG. 3 is displayed. However, the invention is not limited thereto. For example, when the spread assist application is activated, the spread assist setting screen G2 illustrated in FIG. 4 or FIG. 5 or the spread assist screen G7 or G8 instead of the spread assist application home screen G1 illustrated in FIG. 3 may be displayed to prompt the user to input the spreading width information. When the spread assist application activated, the spread assist screen G6 including the captured image such as being illustrated in FIG. 9 or the spread assist screen G7 or G8 including the virtual overhead view image 100 such as being illustrated in FIG. 10 or FIG. 11 may be displayed.

Further in an embodiment described above, the numerical value of the spread width is used as the spread width information to generate the virtual overhead view image 100. However, the spread width information does not have to be a numerical value of the spread width, as long as indicating the spread width. For example, the spread width information may be identification information or a model number of the spreader whose spread width is known.

Further in an embodiment described above, the spread assist application is executed by the controller 12*a* of the infotainment system 12. However, the invention is not limited thereto. For example, the spread assist application may be executed by the controller 11 of the vehicle, may be executed by the controller 2*c* of the spreader 2, or may be executed by a combination of the controller 11, the controller 12*a*, and the controller 2*c*.

Further in an embodiment described above, a case has been described in which the controller 12*a* and the display 12*c* of the infotainment system 12 are used as a part of the spread assist device. However, the invention is not limited thereto. For example, a device including a controller and a display for the spread assist device may be used separately from the infotainment system 12.

Further in an embodiment described above, the controller 12*a* of the infotainment system 12 of the vehicle 3, the position detector 10, the camera 4, the controller 2*c* and the spread mechanism 2*b* of the spreader 2 are wired, but they may be at least partially wired.

Further, a spread assist application may be installed on a portable device such as a smartphone or electronic tablet to function as a part of the spread assist device, for example. In this case, it is desirable that the mobile terminal, the camera, and the smartphone be able to communicate wirelessly.

Further in an embodiment described above, an input from the user is made by the user operating the touch panel of the display 12*c* or the input part 12*d*. However, an input from the user may also be provided by other means, such as voice input or the like.

Further in an embodiment described above, the position detector 10 (GPS or the like) is installed in the vehicle 3, but may be installed in the spreader 2. In the case where the position detector 10 is attached to the vehicle 3 as in an embodiment described above, the tracking information of the detected position of the spreader apparatus 1 detected by the position detector 10 may be corrected according to the distance between the position detector 10 and the spreader 2 (more specifically, the spreading port of the hopper 2*a*) or may be corrected according to the movement of the connecting arm that connects the vehicle 3 and the spreader 2. In this case, a more accurate spread path can be generated. In the case where the position detector 10 is attached to the spreader 2, a more accurate spread path can be generated without the correction described above.

Also, the vehicle 3 may be configured to perform automatic operation. That is, the vehicle 3 may include an electric throttle, an electric steering, an electric brake, and the like, and the travel route thereof may be controlled by a vehicle control device.

Further, the vehicle 3 may be provided with a differential mechanism, a left and right independent drive structure, or etc., and the left and right wheels may be rotatable individually. With this, it is possible to further reduce areas where the spreading object is not spread when the vehicle 3 turns.

The invention includes other embodiments or modifications in addition to one or more embodiments and modifications described above without departing from the spirit of the invention. The one or more embodiments and modifications described above are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A spread assist device for assisting spreading by a spreader apparatus, comprising:
   a position detector comprising a satellite positioning system configured to detect a position of the spreader apparatus; and
   a controller including one or more processors,
   wherein
   the controller is configured to perform operations comprising operations to:
   obtain spread width information indicating a spread width of a spreading object to be spread from the spreader apparatus in a width direction orthogonal to a travel direction of the spreader apparatus; and
   obtain tracking information of a detected position of the spreader apparatus detected by the position detector;
   generate, based on the spread width information and the tracking information, a virtual overhead view image, which is to be displayed on a display, including a spread path that is being executed and has the spread width; and
   generate a spreader apparatus indicator indicating a current position of the spreader apparatus based on the current position of the spreader apparatus detected by the position detector, and superimpose the spreader apparatus indicator on the virtual overhead view image.

2. The spread assist device according to claim 1, wherein the controller is configured to perform operations further comprising operations to:
   obtain an overhead image of an area around the detected position of the spreader apparatus, and
   display the obtained overhead image, superimposed on the virtual overhead view image including the spread path.

3. The spread assist device according to claim 1, wherein the controller is configured to perform operations further comprising operations to generate the virtual overhead view image such that the spread path is displayed in different appearances depending on a spread density of the spreading object.

4. The spread assist device according to claim 3, wherein the controller is configured to perform operations further comprising operations to generate the virtual overhead view image such that a display appearance of a portion of the spread path that is overlapped with another portion of the spread path differs from a portion of the spread path that is not overlapped with the other portions of the spread path so that the spread path is displayed in the different appearances depending on the spread density of the spreading object.

5. The spread assist device according to claim 1, wherein the controller is configured to perform operations further comprising operations to:
   obtain an image captured by an image capturing device configured to perform imaging of a spread status of the spreading object, and
   display one of the captured image and the virtual overhead view image on the display.

6. The spread assist device according to claim 5, wherein the controller is configured to perform operations further comprising operations, while the spreader apparatus is traveling, to switch, based on a user input, between the display of the captured image and the display of the virtual overhead view image.

7. The spread assist device according to claim 5, wherein, the controller is configured to perform operations further comprising operations, based on a user input, to enlarge or reduce the one of the captured image and the virtual overhead view image.

8. The spread assist device according to claim 1, wherein the controller is configured to perform operations further comprising operations to:
   obtain an image captured by an image capturing device configured to image a spread status of the spreading object, and
   process the captured image and obtain spread width information, which indicates the spread width of the spreader apparatus.

9. The spread assist device according to claim 1, further comprising
   a user interface configured to accept a user input, wherein
   the controller is configured to perform operations further comprising operations, based on spread width information for determining the spread width received at the user interface, to generate the virtual overhead view image.

10. The spread assist device according to claim 9, wherein the controller is configured to perform operations further comprising operations to:
    obtain one or more past spreading histories in the vicinity of the detected position of the spreader apparatus, and
    based on the one or more past spreading histories, to display past spreading information on the virtual overhead view image.

11. The spread assist device according to claim 9, wherein the controller is configured to perform operations further comprising operations to:
    obtain one or more past spreading histories in the vicinity of the detected position of the spreader apparatus, and
    generate one or more past spread paths based on the obtained one or more past spreading histories, and overlays the one or more past spread paths and the spread path being executed in different display appearances.

12. The spread assist device according to claim 9, wherein the controller configured to perform operations further comprising operations to:
    display a spread planning screen that prompts a user to input spread plan information, and
    generate, based on the input spread plan information, a recommended spread path for the spreader apparatus to pass through and superimpose the recommended spread path on the virtual overhead view image.

13. The spread assist device according to claim 9, wherein the controller is configured to perform operations further comprising operations to generate the virtual overhead view image that includes the spread path and passed routes of wheels of the spreader apparatus from a start of the spreading.

14. The spread assist device according to claim 9, wherein the controller is configured to perform operations further comprising operations, upon receiving an input of a start of the spreading through the user interface, to start generating the virtual overhead view image including the spread path.

15. The spread assist device according to claim 14, wherein
the controller is configured to perform operations further comprising operations to:
upon receiving an input of an end of the spreading by the spreader apparatus through the user interface, terminate the generation of the virtual overhead view image including the spread path, and
store data related to the generated spread path in a storage as a past spreading history.

16. A spread assist device for assisting spreading by a spreader apparatus, comprising:
a position detector comprising a satellite positioning system configured to detect a position of the spreader apparatus; and
a controller including one or more processors, wherein
the controller is configured to perform operations comprising operations to:
obtain spread width information indicating a spread width of a spreading object to be spread from the spreader apparatus in a width direction orthogonal to a travel direction of the spreader apparatus; and
obtain tracking information of a detected position of the spreader apparatus detected by the position detector; and
generate, based on the spread width information and the tracking information, a virtual overhead view image, which is to be displayed on a display, including a spread path that is being executed and has the spread width, wherein
the spreader apparatus is configured to start dropping the spreading object from the spreader apparatus in response to a spread start signal, and to terminate dropping the spreading object from the spreader apparatus in response to a spread end signal,
the controller is configured to perform operations further comprising operations to:
in response to the spread start signal, start generating the virtual overhead view image including the spread path, and
in response to the spread end signal, terminate the generation of the virtual overhead view image including the spread path.

17. A spread assist device for assisting spreading by a spreader apparatus, comprising:
an image capturing device comprising a camera configured to perform imaging of a field behind the spreader apparatus in a direction in which the spreader apparatus is traveling;
a position detector comprising a satellite positioning system configured to detect a position of the spreader apparatus; and
a controller including one or more processors, wherein
the controller is configured to perform operations comprising operations to:
obtain tracking information of a detected position of the spreader apparatus detected by the position detector;
generate, based on the tracking information, a virtual overhead view image including a spread path that is being executed;
display, on a display, a first assist screen including the image of the field behind the spreader apparatus captured by the image capturing device while the spreader apparatus is traveling and a second assist screen including the virtual overhead view image, and
switch, based on a user input, the display between the first assist screen and the second assist screen.

18. A method of assisting spreading performed by a spreader apparatus, comprising:
obtaining spread width information indicating a spread width of a spreading object to be spread from the spreader apparatus in a width direction orthogonal to a traveling direction of the spreader apparatus;
obtaining tracking information of a detected position of the spreader apparatus detected by a position detector;
generating, based on the spread width information and the tracking information, a virtual overhead view image including an on-going spread path having the spread width; and
generating a spreader apparatus indicator indicating a current position of the spreader apparatus based on the current position of the spreader apparatus detected by the position detector, and superimposing the spreader apparatus indicator on the virtual overhead view image.

* * * * *